(12) United States Patent
Mahajan et al.

(10) Patent No.: US 9,420,029 B2
(45) Date of Patent: Aug. 16, 2016

(54) MOBILE DEVICE APPLICATION RATING

(71) Applicant: Cellco Partnership, Arlington, VA (US)

(72) Inventors: Amit Mahajan, Bridgewater, NJ (US); Jacques Meekel, Hampton, NJ (US); Greselda P. Powell, Morristown, NJ (US); Krishna P. Iyer, Aurora, IL (US); Mark Guerra, Hackettstown, NJ (US); Joel Stephen Angiolillo, Weston, MA (US); Graham David Sysko, Cambridge, MA (US)

(73) Assignee: Cellco Partnership, Basking Ridge, NJ (US)

( * ) Notice: Subject to any disclaimer, the term of this patent is extended or adjusted under 35 U.S.C. 154(b) by 410 days.

(21) Appl. No.: 13/932,728

(22) Filed: Jul. 1, 2013

(65) Prior Publication Data
US 2015/0006677 A1  Jan. 1, 2015

(51) Int. Cl.
*G06F 15/16* (2006.01)
*H04L 29/08* (2006.01)

(52) U.S. Cl.
CPC .................................... *H04L 67/02* (2013.01)

(58) Field of Classification Search
USPC .......................................... 709/203, 217, 219
See application file for complete search history.

(56) References Cited

U.S. PATENT DOCUMENTS

| | | | |
|---|---|---|---|
| 2011/0161912 A1* | 6/2011 | Eteminan et al. | 717/101 |
| 2013/0054616 A1* | 2/2013 | Ammar et al. | 707/748 |
| 2014/0188781 A1* | 7/2014 | Fawaz et al. | 706/59 |
| 2014/0351021 A1* | 11/2014 | Higbie | 705/7.35 |
| 2014/0379747 A1* | 12/2014 | Majumder et al. | 707/769 |

* cited by examiner

*Primary Examiner* — Frantz Jean

(57) ABSTRACT

A system includes a ratings server that receives the list of top applications from a source external to the ratings server and selects at least a subset of the top applications based at least in part on a rank of each of the top applications in the list. The system further includes a test server that tests at least one characteristic of each of the subset of top applications selected by the ratings server and outputs a rating representing the at least one characteristic. The ratings server determines a behavior of each of the subset of top applications based on the rating and publishes the behavior of the subset of top applications for access by a user over a communication network.

20 Claims, 2 Drawing Sheets

MOBILE DEVICE APPLICATION RATING

BACKGROUND

Mobile devices, such as smartphones and tablet computers, allow users to download software applications that are often created by third party developers or to utilize applications that may be pre-loaded on such mobile devices when provided to users. Some users are unable to accurately judge the behavior of a software application and the trustworthiness of the third party developer. Thus, a user may unknowingly download a software application that seeks to infect the smartphone or tablet computer with a virus, inconspicuously transmit the user's personal information for a malicious purpose, consume an unreasonable amount of power, transmit an unreasonable amount of data over a communication network, or otherwise compromise the user's enjoyment of the mobile device. Users who can accurately judge the behavior of a software application and the trustworthiness of the third party developer may avoid such issues.

DETAILED DESCRIPTION

An exemplary system includes a application store server that outputs a list of top applications and a ratings server that receives the list of top applications and selects at least a subset of the top applications based at least in part on a rank of each of the top applications in the list. The system further includes a test server that tests at least one characteristic of each of the subset of top applications selected by the ratings server and outputs a rating representing the at least one characteristic. The ratings server determines a behavior of each of the subset of top applications based on the rating and publishes the behavior of the subset of top applications for access by a user over a communication network. With such a system, users of mobile devices can judge the behavior of a software application and the trustworthiness of the third party developer.

Figure 1:
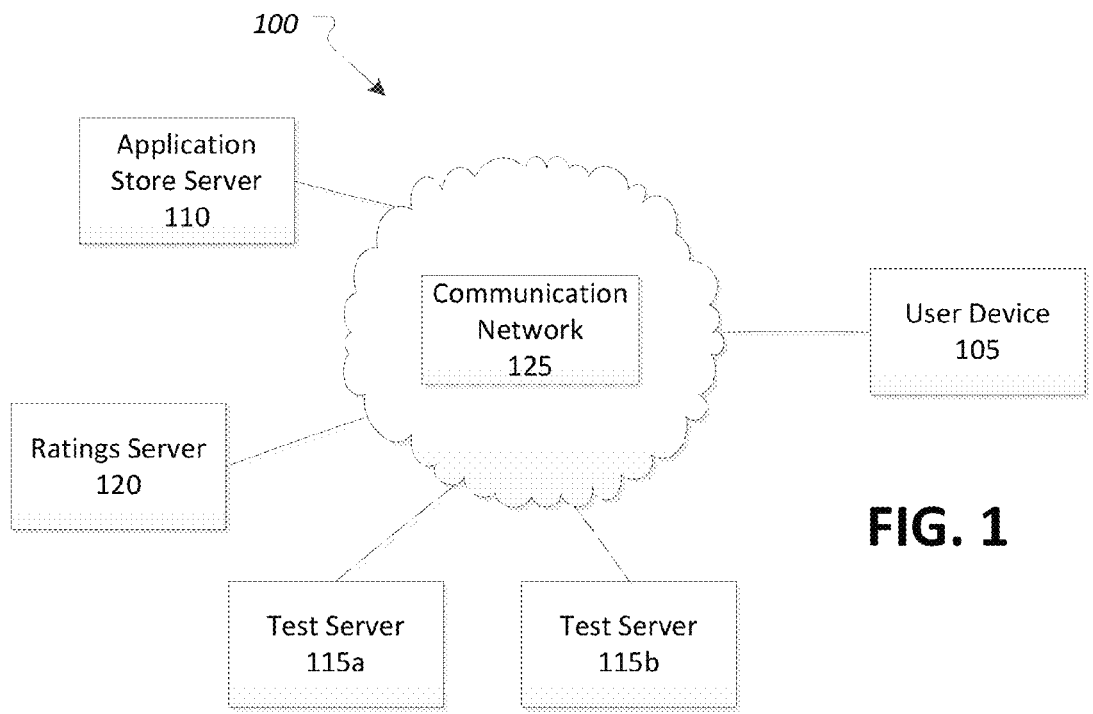
FIG. 1 illustrates an exemplary system for rating applications for mobile devices.

FIG. 1 illustrates an exemplary system 100 for rating applications for mobile devices. The system 100 may take many different forms and include multiple and/or alternate components and facilities. While an exemplary system 100 is shown, the exemplary components illustrated in the Figures are not intended to be limiting. Indeed, additional or alternative components and/or implementations may be used.

As illustrated in FIG. 1, the system 100 may include a user device 105, an application store server 110, a test server 115, and a ratings server 120 in communication over a communication network 125.

The user device 105 may include any computing device configured to download and execute software applications. The user device 105 may include a mobile device such as a smartphone or tablet computer. The user device 105 may be configured to communicate over the communication network 125. For instance, the user device 105 may include hardware and software to allow communication in accordance with various communication protocols such as Wi-Fi, Bluetooth®, Ethernet, code division multiple access (CDMA), Global System for Mobile Communications (GSM), High-Speed Downlink Packet Access (HSDPA), Universal Mobile Telecommunications System (UMTS), High-Speed Packet Access (HSPA), WiMax, and Long Term Evolution (LTE) or the like.

The user device 105 may be configured to execute various software applications. Examples of software applications may include an operating system, productivity applications (e.g., a calendar application, a word processing application, etc.), utility applications (e.g., a calculator, a weather application, etc.), entertainment applications (e.g., applications for music, movies, and games), communication applications (e.g., a phone application, a text messaging application, a video messaging application), a location tracking application, a camera application, a photo viewing application, social networking applications, news applications, an internet browser, an application store application that allows the user of the user device 105 to download applications, and the like. Some applications may be pre-loaded on the user device 105 while others may be downloaded via, e.g., the application store application. In some instances, the user device 105 may include one or more user interface devices (not shown) such as a keyboard, a display screen, or a touch-sensitive display.

The application store server 110 may include an application distribution platform incorporated by any number of computing devices configured to facilitate the transfer of software applications, media content, or both, from one or more application servers (not shown) to the user device 105. In some instances, the application store server 110 may host software applications, media, or both. The application store server 110 may be configured to transmit data over the communication network 125 in accordance with any number of communication protocols. The application store server 110 may be configured to receive queries for particular applications or media content from, e.g., the user device 105 and provide the requested applications or media content in response to the query. The application store server 110 may be further configured to track the number of requests received for each application and media content instance. The application store server 110 may be further configured to determine the popularity of each application and media content instance based at least in part on the number of requests received. That is, the application store server 110 may be configured to determine that applications requested more often over a predetermined period of time are more popular than those requested less often over the same time period. In some instances, the application store server 110 may be configured to output a list of the most popular applications, also referred to as the "top applications." Different factors may be utilized using one or more heuristics to determine if something is a "top application" such as the number of inquiries by users, the number of inquiries made for an application by users, or the number of downloads over a period of time. The list of top applications may include categories of applications such as whether the application is a free application or a paid application. Additionally, the applications included in the list of top applications may be different in different geographic areas. For instance, the top applications for the United States may be different from the top applications for the United Kingdom. Further factors may include those related to physical characteristics of the user device 105 itself including operating system, original equipment manufacturer name, model designations and the like. Thus, for example, a listing of top applications may be different between devices using variants of the "Android" operating system as compared to the "iOs" operating system. The list of top applications may also include a version number for each application listed.

The test server 115 may include any number of computing devices configured to test characteristics of the applications accessible via the application store server 110. Such servers may be associated with one or more entities providing information based on the type of test being conducted. Example characteristics may include security, data usage, power consumption, and usability. These characteristics are described in greater detail below. The test server 115 may be configured to output a rating representing the characteristic tested, and the rating may be related to predefined criteria associated with the characteristic as discussed below. The system 100 may include any number of test servers 115, and in some instances, each test server 115 may be configured to test for a particular characteristic. For instance, one test server 115A may be configured to test for security while another test server 115B may be configured to test for data usage.

Testing for security may include a subset of (i) evaluating whether the application includes software that allows arbitrary code execution (i.e., backdoors or bots), (ii) whether malware used to manipulate software on the user device 105 or files stored on the user device 105 is present, (iii) whether data or potentially confidential information is collected and transmitted to third parties without the user's consent, (iv) whether the application is able to gain root access and perform malicious activities on the user device 105, (v) whether the application includes surveillance software without the user's consent, (vi) whether the application restricts or propagates software attacks on other devices, and (vii) whether there is a presence of an advertisement engine in the application. In some instances, the application under test may be subject to a virus scan using a virus scan software program. The test server 115 may be configured to flag potentially undesirable behavior and the potential risk of such behavior. The portions of the application (e.g., the software code) associated with the undesirable behavior may be compared to known malware to determine whether similarities exist. If so, the test server 115 may be configured to determine that the threat posed by the application is a known threat. If no similar malware exists, the test server 115 may be configured to identify the undesirable behavior as a new threat or altered version of an existing threat.

The test server 115 may be configured to output the rating consistent with the results of the security test. In one possible implementation, the rating may be a number from one (1) to five (5). A rating of one (1) may indicate a critical security threat that will cause irreparable harm to the user device 105. A rating of two (2) may indicate a significant security threat that could result in stolen user data with monetary impact or high value to identity thieves, access and control of the user device 105 granted to a third party, and installation and execution of spyware. A rating of three (3) may indicate a major security threat such as the presence of malicious software user used to gain limited control of the user device 105, software that attempts to root the user device 105 without user knowledge, and the ability to track messages and the user's location without the user's knowledge. A rating of four (4) may indicate a minor security threat such as stolen user data with no monetary impact or no or limited value to identity thieves and surveillance software that provides limited information about the user. A rating of five (5) may indicate no known security threat to the user, the user device 105, and the content stored on the user device 105.

Testing for data usage may include evaluating whether the amount of data transmitted to and from the application on the user device 105 when invoked and when the user device 105 is idle is reasonable. Reference is made to co-pending application Ser. No. 13/731, 903, filed on Dec. 31, 2012, and entitled "Application Idle Current Drain Measurement" for a discussion of a test environment system that may be configured to measure an idle mode of an application under test. The patent application is incorporated herein by reference in its entirety. Testing for data usage may include downloading and running the application on a device under test, which may be the same make and model as the user device 105. The device under test, however, may be connected to a real-time device data collection and diagnostic monitoring tool that logs data traffic for the application during the test period. Once the application is executed, the device under test may be left idle for a predetermined amount of time (e.g., 8 hours). The log file generated by the diagnostic monitoring tool may be transmitted to the test server 115, and the test server 115 may be configured to identify network traffic and data usage of the device under test while running the application in idle. The test server 115 may be configured to ignore certain items in the log file such as data collected from the application during the first few hours after the application was downloaded since some applications use more data during that time to install and synchronize to integrate into the device under test. The data usage required to integrate the application into the device under test may be referred to as "one time download" data. In some instances, the test server 115 may be configured to generate an alert if the "one time download" data exceeds a predetermined threshold such as 100 MB or 10% of the permissible data usage (i.e., the amount of data usage available to the user device 105 based on a subscription with a service provider). The amount of data usage, possibly excluding the "one time download" data, may be scaled to reflect the data usage while the user device 105 is idle for a day and then scaled again to reflect the idle data usage over, e.g., a thirty (30) day period. Moreover, in some situations it may be desirable to separately characterize "one time download" data usage for an application in terms of download and application configuration for use as compared to data usage over time such as when the configured application is left in an idle mode since both can be factors contributing to determining if an application is a "top application". Finally, to determine exactly what data is associated with operation of an application as compared to other applications or intrinsic operation of the user device 105, information may be requested from the application developer.

The test server 115 may be configured to output the rating consistent with the results of the data usage test. The rating may be represented as a number from one (1) to five (5). A rating of one (1) may indicate that the idle data usage exceeds 10% of the permissible data usage. For instance, the user device 105 may be permitted to receive 1 GB of data per month and the test server 115 may be configured to award a rating of one (1) if the idle data usage exceeds 100 MB. A rating of two (2) may indicate that the idle data usage is between 5% and 10% of the permissible data usage. A rating of three (3) may indicate that the idle data usage is between 2.5% and 5% of the permissible data usage. A rating of four (4) may indicate that the idle data usage is between 1% and 2.5% of the permissible data usage. A rating of five (5) may indicate that the idle data usage is less than 1% of the permissible data usage.

Testing for power consumption may include determining whether the current drain caused by the executed application while the device under test is in idle mode exceeds a predetermined threshold amount of current drain in view of various conditions such as no user activity and default settings. More generally, reference is made to co-pending application Ser. No. 13/731, 903, filed on Dec. 31, 2012, and entitled "Application Idle Current Drain Measurement" for a discussion of an idle mode current drain of an application under test. The patent application is incorporated herein by reference in its entirety. The test server 115 may be configured to compare the idle current drain of the device under test in idle mode while running the application to the idle current drain of another device that does not have the application installed. The test server 115 may be configured to determine that the difference between the measured idle current drains is caused by the application installed on the device under test.

The test server 115 may be configured to output the rating consistent with the results of the power consumption test. The ratings may be output as a number. A rating of one (1) may indicate a current drain that would reduce the battery life of the user device 105 by, e.g., 2 hours. A rating of two (2) may indicate a current drain that would reduce the battery life of the user device 105 by, e.g., 1.5 hours to 2 hours. A rating of three (3) may indicate a current drain that would reduce the battery life of the user device 105 by, e.g., 1 hour to 1.5 hours. A rating of four (4) may indicate a current drain that would reduce the battery life of the user device 105 by, e.g., thirty (30) minutes to 1 hour. A rating of five (5) may indicate a current drain that would reduce the battery life of the user device 105 by, e.g., less than thirty (30) minutes.

Testing for usability may include determining whether the application complies with one or more usability principles. The test server 115 may be configured to test for compliance of the usability principles directly or may determine compliance based on a user input. In some instances, compliance of the usability principles may be based on a combination of tests performed by the test device and received user inputs. For instance, the test server 115 may be configured to monitor how the user uses the application on the device under test and the test server 115 may make determinations about usability based on the user inputs. For instance, the test server 115 may count the number of clicks required for the application to perform a relatively simple operation. Moreover, the test server 115 may count the number of times a user presses a "back" button, which may indicate that the application lacks a logical flow.

Example usability principles tested may include safety, stability, responsiveness, ease of learning, intuitiveness, simplicity, and polish. Safety may include considering whether the user is tricked into performing unintended actions, such as making unwanted purchases. Safety may further consider whether the user is provided with an option to confirm and undo certain destructive actions. Moreover, controls for destructive actions are not placed in a user interface near, or easily confused with, frequently used controls. Also, safety considers whether error messages are clear and provide proper guidance to the user. Stability may consider whether the user will experience forced closures (e.g., crashes), freezes, or errors. Responsiveness may consider how quickly the application responds to user actions and whether appropriate feedback (e.g., loading screens) is presented to users during unavoidable delays. Ease of learning may consider whether the application helps the user learn how to use the application using step-by-step guidance, commands, prompts, instructions, etc., in language that is easy for the user to understand. Intuitiveness may consider whether the application follows common conventions and uses commonly understood icons. Moreover, intuitiveness may consider whether the application presents steps in a logical order, and the state (e.g., on, off, waiting for input, working) of the application is always clear to the user. Simplicity may consider whether the application is designed to make certain tasks easy for the user and that the application is not cluttered with unnecessary and confusing visual elements, features, or controls. The polish of the application may consider whether inputs (e.g., buttons) are sufficiently sized, text is easy to read and has been professionally edited, audio and video quality is consistently good, links direct the user to the intended destination, no graphics are missing, and there is no evidence of poor production quality.

The test server 115 may be configured to output the rating consistent with the results of the usability test. In some instances, the test server 115 may be configured to output the usability as a number from, e.g., one (1) to five (5). A rating of one (1) may indicate that the application complied with fewer than 25% of the usability principles. A rating of two (2) may indicate that the application complied with between 25% and 49% of the usability principles. A rating of three (3) may indicate that the application complied with between 50% and 74% of the usability principles. A rating of four (4) may indicate that the application complied with at least 75% of the usability principles. A rating of five (5) may indicate that the application complied with 100% of the usability principles.

Once the ratings for each characteristic—security, data usage, power consumption, and usability—have been determined, the test server 115 may be configured to output the ratings to, e.g., the ratings server 120 via the communication network 125. In some instances, the test server 115 may be configured to only test the applications identified by the ratings server 120, as discussed in greater detail below. That is, testing every application available via the application store server 110 may be unreasonable given the number of available applications. Thus, the testing server may be configured to test only the most popular applications as determined by the ratings server 120.

The ratings server 120 may include any number of computing devices configured to receive the list of top applications from the application store server 110 and select at least a subset of the top applications based on, e.g., a rank of each of the top applications in the list. In one exemplary approach ranking uses the same criteria as for determination that something is a "top application", but then ordering the results from the one that best meets the criteria toward the one that least meets the criteria. In other exemplary approaches ranking may utilize dissimilar criteria such as the determination of user satisfaction based on feedback provided by users. In one possible approach, the ratings server 120 may be configured to receive the list of top applications daily from the application store server 110. In one possible approach, the ratings server 120 may designate each top application in the list for testing. Alternatively, the ratings server 120 may determine that only certain applications, such as the applications that are consistently the "top applications" should be tested. To determine a subset of the top applications for testing, the ratings server 120 may be configured to average the rank of each application in the list of top applications over a predetermined period of time (e.g., 30 days). The applications with the highest average rank may be selected for testing. In other cases the applications with the lowest average rank may be selected for testing particularly when different criteria is used since such a ranking may indicate significant issues with the application that are worthy of more in-depth analysis (e.g., a "top application" that has very negative user feedback). In some instances, the number of applications selected for testing may be fewer than the number of applications listed in the list of top applications. This way, applications that appear in the list of top applications only a few times over the predetermined period of time will not need to be tested. By way of example, the list of top applications received from the application store server 110 may identify forty (40) applications, but the subset selected for testing may only include twenty-five (25) applications. In this example, the top twenty-five (25) applications selected for testing may be the top twenty-five (25) applications by average rank over the thirty-day period. The ratings server 120 may identify the top applications that need to be tested to the test server 115.

The ratings server 120 may be further configured to receive the ratings for the various characteristics tested by the test server 115. Using the ratings, the ratings server 120 may be configured to determine a behavior of each of the top applications selected for testing. In some instances, the ratings server 120 may be configured to publish the behavior for access by the user over the communication network 125. In one possible approach, the ratings server 120 may be configured to publish the behavior of the tested applications on a website.

The ratings server 120 may be configured to determine the behavior of each tested application by averaging the ratings received from the test server 115. As discussed above, the ratings may be represented by the numbers one (1) through five (5). The ratings server 120 may be configured to average the ratings associated with security, data usage, power consumption, and usability to determine the behavior. For instance, an application that receives a rating of five (5) each tested characteristic may receive a behavior score of five (5). An application that receives a rating of five (5) for security and data usage but a rating of four (4) for power consumption and usability may receive a behavior score of 4.5. In some instances, the ratings server 120 may be configured to weight the rating of each characteristic equally. Alternatively, some ratings may be given a higher or lower weight. For instance, the behavior score of applications that do not have a user interface (e.g., applications that run in the background) need not reflect usability. Moreover, the purpose of the application may dictate that different weights should be applied to the different characteristics. For example, a higher weight may be given to security for applications dealing with personal information such as banking applications.

The ratings server 120 may be configured to exclude certain applications from testing. For instance, applications that have been previously tested and have not been updated may not need to be tested again. The ratings server 120 may be configured to store a version number of each application tested and may compare version numbers to determine whether the application has changed since a previously performed test. The ratings server 120 may be configured to exclude the application from testing if it has already been tested and the version number is the same as at the time the application was tested. If the version number has changed, however, the ratings server 120 may be configured to rank the application as previously discussed. Moreover, the ratings server 120 may be configured to exclude applications that are pre-loaded onto the user device 105 at the time of purchase from testing even if those applications may also be available for download via the application store server 110.

In general, computing systems and/or devices, such as the user device 105, the application store server 110, the test server 115, and the ratings server 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
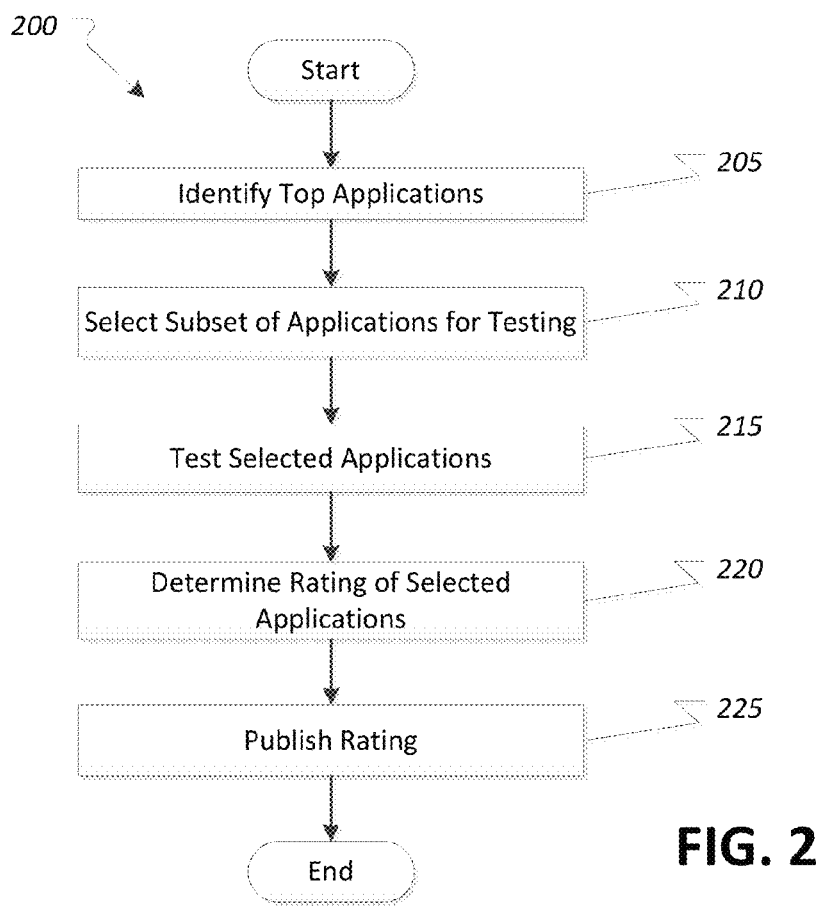
FIG. 2 is a flowchart of an exemplary process for rating applications.

FIG. 2 illustrates a flowchart of an exemplary process 200 that may be used to rate applications and present the ratings to a user.

At block 205, the ratings server 120 may identify a plurality of top applications. For instance, the ratings server 120 may receive a list of top applications from, e.g., the application store server 110 over the communication network 125. In one possible approach, the list of top applications may represent the top applications by number of downloads to user devices 105 over a predetermined amount of time. For instance, the ratings server 120 may receive a list of top applications daily, weekly, or monthly.

At block 210, the ratings server 120 may select a subset of the top applications for testing. The subset of top applications may be selected based on an average rank of each of the top applications identified at block 205 over a period of time. For instance, if the list of top applications is received daily, the subset selected at block 210 may include those applications with the highest average rank taken over a thirty-day period. Thus, the ratings server 120 may determine the rank of each application in each list received at block 205 and average the ranks at the end of, e.g., the thirty-day period. The subset may include the applications with the highest average rankings, which may actually be the lowest number (i.e., the top-ranked application is number 1). The number of applications selected at block 210 may be fewer than the number of applications identified in the lists received at block 205. For instance, forty (40) applications may be identified in the list at block 205 but only twenty-five (25) may be selected for testing at block 210. This way, the ratings server 120 may consider applications that do not always appear in the top twenty-five (25) results for inclusion in the subset of applications for testing. Moreover, the ratings server 120 may consider whether any applications received in the lists at block 205 should be excluded. Example excluded applications may include applications provided by the manufacturer of the user device 105 and applications that have been previously tested and have not been updated since the previous test was performed.

At block 215, the test server 115 may test for at least one characteristic of each of the top applications selected at block 210. The ratings server 120 may identify the selected applications to the test server 115. The test server 115 may conduct the test of the selected applications for each characteristic to determine a behavior of each of the selected applications. Multiple test servers 115 may be used, and each test server 115 may test for a different characteristic. Testing for the characteristic includes determining a rating of the characteristic for the application under test. The rating may be based on predefined criteria, which may include empirical criteria, associated with the characteristic. Example characteristics include security, data usage, power consumption, and usability and example criteria for each of these characteristics are discussed above.

At block 220, the ratings server 120 may determine the behavior of each of the subset of applications selected at block 210. The behavior of the application may be based on, e.g., an average of the ratings resulting from the tests performed at block 215. In some instances, multiple ratings may represent the ratings resulting from tests of different characteristics. Alternatively, the multiple ratings may represent the results of testing the same characteristic but from a different test server 115 or using different criteria. Moreover, the behavior may be determined from an equal weight applied to all ratings. In some instances, however, some ratings may be given more or less weight depending on various circumstances. For example, a higher weight may be given to the security characteristic for applications dealing with personal information such as banking applications.

At block 225, the ratings server 120 may publish the behavior of each of the subset of the top applications via a ratings server 120 accessible to a user over a communication network 125. For instance, the ratings server 120 may present the name of the application along with an indication of the ratings for each characteristic and the behavior, which as discussed above may include the average of the ratings, via a web page accessible to the user via a web browser. The ratings server 120, therefore, may present the behavior to the user as a hypertext markup language (HTML) document.

Figure 3:
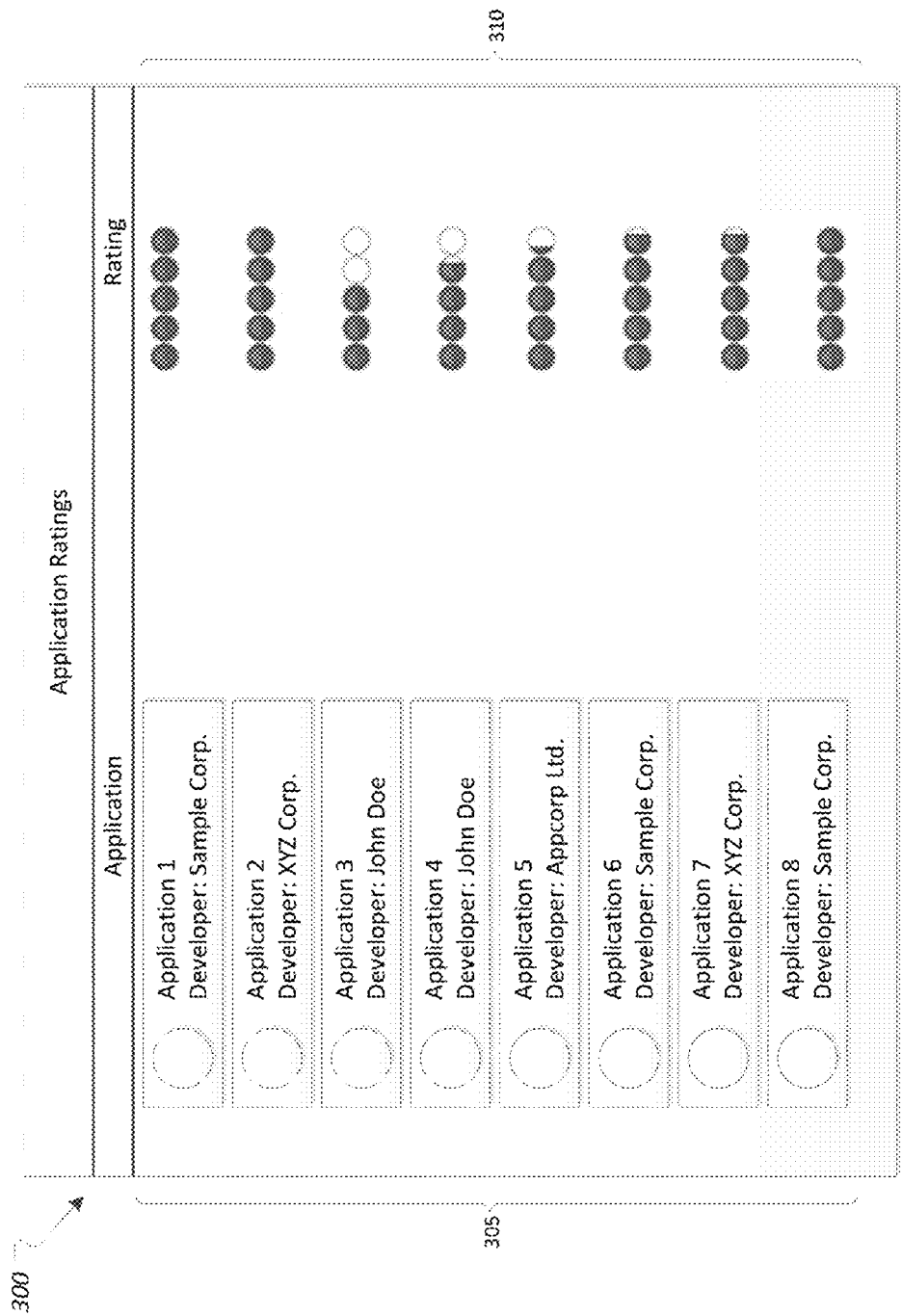
FIG. 3 illustrates an exemplary graphical user interface for presenting ratings of applications to a user.

FIG. 3 is an example graphical user interface 300 for presenting ratings of applications 305 to a user. The listing shown includes a rating 310 for each of the eight applications 305 shown. Based on the presented ratings 310, a user may be able to easily identify which applications 305 are of higher quality (e.g., are less likely to cause issues with battery life, are more likely to be secure, are designed for usability, and do not cause unreasonable data usage in terms of behavior). For example, "Application 3" can be seen to exhibit lower quality as compared to other applications such as "Application 1" and "Application 8" which are rated relatively higher. In some instances, the graphical user interface 300 may include separate indications of the different characteristics tested. That is, separate columns may be shown for the ratings associated with security, data usage, power consumption, usability, and the overall behavior.

With the exemplary system 100, a service provider may maintain and provide application ratings of various applications under test according to different characteristics. These application ratings may allow users to make informed decisions with respect to side effects of the installation of applications on the user device 105.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
identifying a plurality of top applications;
selecting at least a subset of the top applications based on a rank of each of the plurality of top applications identified;
testing at least one characteristic of each of the subset of the top applications to determine a behavior of each of the subset of the top applications;
outputting a rating representing the at least one characteristic, the rating being related to predefined criteria associated with the at least one characteristic; and
publishing the behavior of each of the subset of the top applications via a ratings server accessible to a user over a communication network;
wherein the at least one characteristic includes at least security, and testing of security includes evaluating at least:
whether each of the subset of the top applications includes software that allows arbitrary code execution;
whether malware used to manipulate software on a device is present; and
whether each of the subset of the top applications includes surveillance software without authorization.

2. The method of claim 1, wherein the top applications are those downloaded by users most often relative to a predetermined amount of time and the rank reflects an ordering from the most downloaded application toward the least downloaded application.

3. The method of claim 1, wherein selecting at least a subset of the top applications includes identifying a predetermined number of the plurality of top applications based at least in part on the rank of each of the plurality of top applications.

4. The method of claim 1, wherein testing the at least one characteristic includes determining the rating of the at least one characteristic, and wherein the behavior of each of the subset of the top applications is based at least in part on the rating.

5. The method of claim 4, wherein the behavior is determined from an average of multiple ratings, each associated with a different characteristic.

6. The method of claim 5, wherein the multiple ratings are weighted equally.

7. The method of claim 1, wherein the predefined criteria includes empirical criteria.

8. The method of claim 1, wherein the testing of security includes further evaluating at least one of:
whether data or confidential information is collected and transmitted to third parties without authorization;
whether each of the subset of the top applications restricts or propagates software attacks on the device; and
whether there is a presence of an advertisement engine in each of the subset of the top applications.

9. The method of claim 1, wherein the at least one characteristic further includes data usage, and the testing of data usage includes evaluating whether an amount of data transmitted to and from each of the subset of the top applications exceeds a predetermined threshold.

10. The method of claim 1, wherein the at least one characteristic further includes power consumption, and the testing of power consumption includes evaluating whether a current drain caused by each of the subset of the top applications exceeds a predetermined threshold.

11. The method of claim 1, wherein the at least one characteristic further includes usability, and the testing of usability includes determining whether each of the subset of the top applications complies with at least one usability principle including at least one of safety, stability, responsiveness, ease of learning, intuitiveness, simplicity, and polish.

12. A system comprising:
a ratings server configured to receive a list of top applications from a source external to the ratings server and select at least a subset of the top applications based at least in part on a rank of each of the top applications in the list; and
a test server configured to test at least one characteristic of each of the subset of top applications selected by the ratings server and output a rating representing the at least one characteristic, the rating being related to predefined criteria associated with the at least one characteristic;
wherein the ratings server is configured to determine a behavior of each of the subset of top applications based on the rating and publish the behavior of the subset of top applications for access by a user over a communication network; and
wherein the at least one characteristic includes at least security, and testing of security includes evaluating at least:
whether each of the subset of the top applications includes software that allows arbitrary code execution;
whether malware used to manipulate software on a device is present; and
whether each of the subset of the top applications includes surveillance software without authorization.

13. The system of claim 12, wherein the rank is an average rank relative to a predetermined amount of time.

14. The system of claim 12, wherein the ratings server is configured to identify a predetermined number of top applications based at least in part on the rank of each of the top applications in the list.

15. The system of claim 12, wherein the test server is configured to determine the rating of the at least one characteristic, and wherein the ratings server is configured to determine the behavior of each of the top applications based at least in part on the rating received from the test server.

16. The system of claim 15, wherein the ratings server is configured to determine the behavior from an average of multiple ratings, each associated with a different characteristic.

17. The system of claim 16, wherein the ratings server is configured to weight each rating equally.

18. A non-transitory computer readable medium tangibly embodying computer-executable instructions that cause a processor to execute operations comprising:
identifying a plurality of top applications;
selecting at least a subset of the top applications based on a rank of each of the plurality of top applications identified;

determining a behavior of each of the subset of the top applications based on a test of at least one characteristic of each of the subset of the top applications;

outputting a rating representing the at least one characteristic, the rating being related to predefined criteria associated with the at least one characteristic; and publishing the behavior of each of the subset of the top applications via a ratings server accessible to a user over a communication network;

wherein the at least one characteristic includes at least security, and testing of security includes evaluating at least:

whether each of the subset of the top applications includes software that allows arbitrary code execution;

whether malware used to manipulate software on a device is present; and whether each of the subset of the top applications includes surveillance software without authorization.

19. The computer-readable medium of claim 18, wherein the rank is an average rank relative to a predetermined amount of time.

20. The computer-readable medium of claim 19, wherein selecting at least a subset of the top applications includes identifying a predetermined number of the plurality of top applications based at least in part on the average rank of each of the plurality of top applications.

* * * * *